US009886844B2

(12) United States Patent
Amano

(10) Patent No.: US 9,886,844 B2
(45) Date of Patent: Feb. 6, 2018

(54) INFORMATION PROCESSING APPARATUS, INFORMATION PROCESSING METHOD, AND PROGRAM

(75) Inventor: Naoki Amano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 635 days.

(21) Appl. No.: 13/438,714

(22) Filed: Apr. 3, 2012

(65) Prior Publication Data

US 2012/0297040 A1 Nov. 22, 2012

(30) Foreign Application Priority Data

May 20, 2011 (JP) ................................ 2011-113842

(51) Int. Cl.

*G06F 15/173* (2006.01)
*G08C 17/02* (2006.01)
*G08C 23/04* (2006.01)

(52) U.S. Cl.

CPC ............. *G08C 17/02* (2013.01); *G08C 23/04* (2013.01); *G08C 2201/71* (2013.01); *G08C 2201/91* (2013.01); *G08C 2201/93* (2013.01)

(58) Field of Classification Search

CPC ......... H04L 2012/2849; H04L 12/2812; H04L 12/2809; H04L 67/16
USPC .......................................................... 709/223
See application file for complete search history.

(56) References Cited

U.S. PATENT DOCUMENTS

2005/0101314 A1* 5/2005 Levi ................... G08B 21/0238 455/423
2009/0248702 A1* 10/2009 Schwartz .......... G06F 17/30029
2010/0095332 A1* 4/2010 Gran ................. G06F 17/30038 725/93
2011/0321091 A1* 12/2011 Lee .................... H04N 13/0454 725/39
2012/0124245 A1* 5/2012 Reeves et al. .................... 710/8

FOREIGN PATENT DOCUMENTS

JP 2007-028021 2/2007
JP 2008-310451 12/2008
WO WO 2012/123017 A1 * 9/2012 ............ H04L 12/28

* cited by examiner

*Primary Examiner* — Sm Rahman
(74) *Attorney, Agent, or Firm* — Paratus Law Group, PLLC

(57) ABSTRACT

Disclosed herein is an information processing apparatus including: a storage block configured to store information about a combination of devices being selected to be controlled by a function of a first application and devices being selected to be controlled by a function of a second application; and a selection block configured to select, among the devices controllable by the function of the second application, a device in the same combination being selected to be controlled by the function of the first application on the basis of the above-mentioned information stored in the storage block.

10 Claims, 14 Drawing Sheets

FIG. 8

| IR DEVICE | DLNA DEVICE |
|---|---|
| TV1 | NOTE-SIZE PC1 |
| AIR CONDITIONER | TV2, BD RECORDER |
| ⋮ | ⋮ |

INFORMATION PROCESSING APPARATUS, INFORMATION PROCESSING METHOD, AND PROGRAM

BACKGROUND

The present technology relates to an information processing apparatus, an information processing method, and a program that are configured to allow the selection of a desired device by linking two or more applications with each other.

Recently, DLNA (Digital Living Network Alliance) devices compliant with DLNA have been popularized. Interconnecting two or more DLNA devices via a home network allows a user to reproduce the content stored in a DLNA device functioning as a DMS (Digital Media Server) on another DLNA device functioning as a DMR (Digital Media Renderer).

A DMS stores content, such as music and video, and distributes the content to other DLNA devices functioning as DMRs. On the other hand, a DMR is a device that reproduces content and outputs the reproduced content. A DMC (Digital Media Controller) that controls other DLNA devices may have the function of DMS.

In order to reproduce content, the user selects a predetermined DMR on a selection screen displayed by a DMC for example, thereby reproducing the content on the selected DMR.

Japanese Patent Laid-Open Nos. 2008-310451 and 2007-28021 disclose the related art of the present technology.

SUMMARY

If there are two or more DMRs in a home, it is convenient for the user if the DMR located in the room in which the user is currently located is preferentially displayed on the selection screen. However, the IP (Internet Protocol) technologies on which DLNA is based cannot identify the distance to the DMR.

Therefore, the present technology addresses the above-identified and other problems associated with related-art methods and apparatuses and solves the addressed problems by providing an information processing apparatus, an information processing method, and a program that are configured to allow the selection of a desired device by linking two or more applications with each other.

In carrying out the technology and according to one embodiment thereof, there is provided an information processing apparatus. This information processing apparatus has a storage block configured to store information about a combination of devices being selected to be controlled by a function of a first application and devices being selected to be controlled by a function of a second application; and a selection block configured to select, among the devices controllable by the function of the second application, a device in the same combination being selected to be controlled by the function of the first application on the basis of the above-mentioned information stored in the storage block.

If information of a device controllable by the function of the second application is displayed, the information processing apparatus may further include: a display control block configured to display information about a device selected by the selection block prior to information about other devices.

The display control block may display the information about the device selected by the selection block at a center of information about a device controllable by the function of the second application.

The display control block may display the information about the device selected by the selection block larger than the information about other devices.

The display control block may display the information about the device selected by the selection block in a color different from that of the information about other devices.

The information processing apparatus may further include: a control block configured to control a predetermined device selected from among devices controllable by the function of the second application.

The first application may be an application having a function of transmitting a signal by use of infrared radiation to control a device to be controlled and the second application may be an application having a function of transmitting a signal by use of electromagnetic waves to control a device to be controlled.

The second application may be an application for controlling a device compliant with a DLNA (Digital Living Network Alliance) standard.

If a first device is selected to be controlled by the function of the first application and when a second device is selected to be controlled by the function of the second application, the storage block may store information indicative of a combination of the first device and the second device.

The storage block may update the information about the combination of the first device and the second device every time the second device is selected to be controlled.

The storage block may store information indicative of a combination of a singularity of the first device and a plurality of the second devices.

According to another embodiment thereof, there is provided an information processing method. This method includes: storing information about a combination of devices being selected to be controlled by a function of a first application and devices being selected to be controlled by a function of a second application; and selecting, among the devices controllable by the function of the second application, a device in the same combination being selected to be controlled by the function of the first application on the basis of the above-mentioned stored information.

According to a further embodiment thereof, there is provided a program for making a computer execute processing including: storing information about a combination of devices being selected to be controlled by a function of a first application and devices being selected to be controlled by a function of a second application; and selecting, among the devices controllable by the function of the second application, a device in the same combination being selected to be controlled by the function of the first application on the basis of the above-mentioned stored information.

BRIEF DESCRIPTION OF THE DRAWINGS

Other embodiments of the technology will become apparent from the following description of embodiments with reference to the accompanying drawings in which:

FIG. 8 is a diagram illustrating an exemplary log of combinations of IR devices and DLNA devices;

DETAILED DESCRIPTION OF THE PREFERRED EMBODIMENTS

This technology will be described in further detail by way of embodiments thereof with reference to the accompanying drawings. The description will be made in the following order:

(1) First embodiment (an example in which the information of an IR remote controller application is referenced from a DLNA application to select a DLNA device); and (2) Second embodiment (an example in which the information of a DLNA application is referenced from an IR remote control application to register an IR device).

(1) First Embodiment

Configuration of the Communication System

Figure 1:
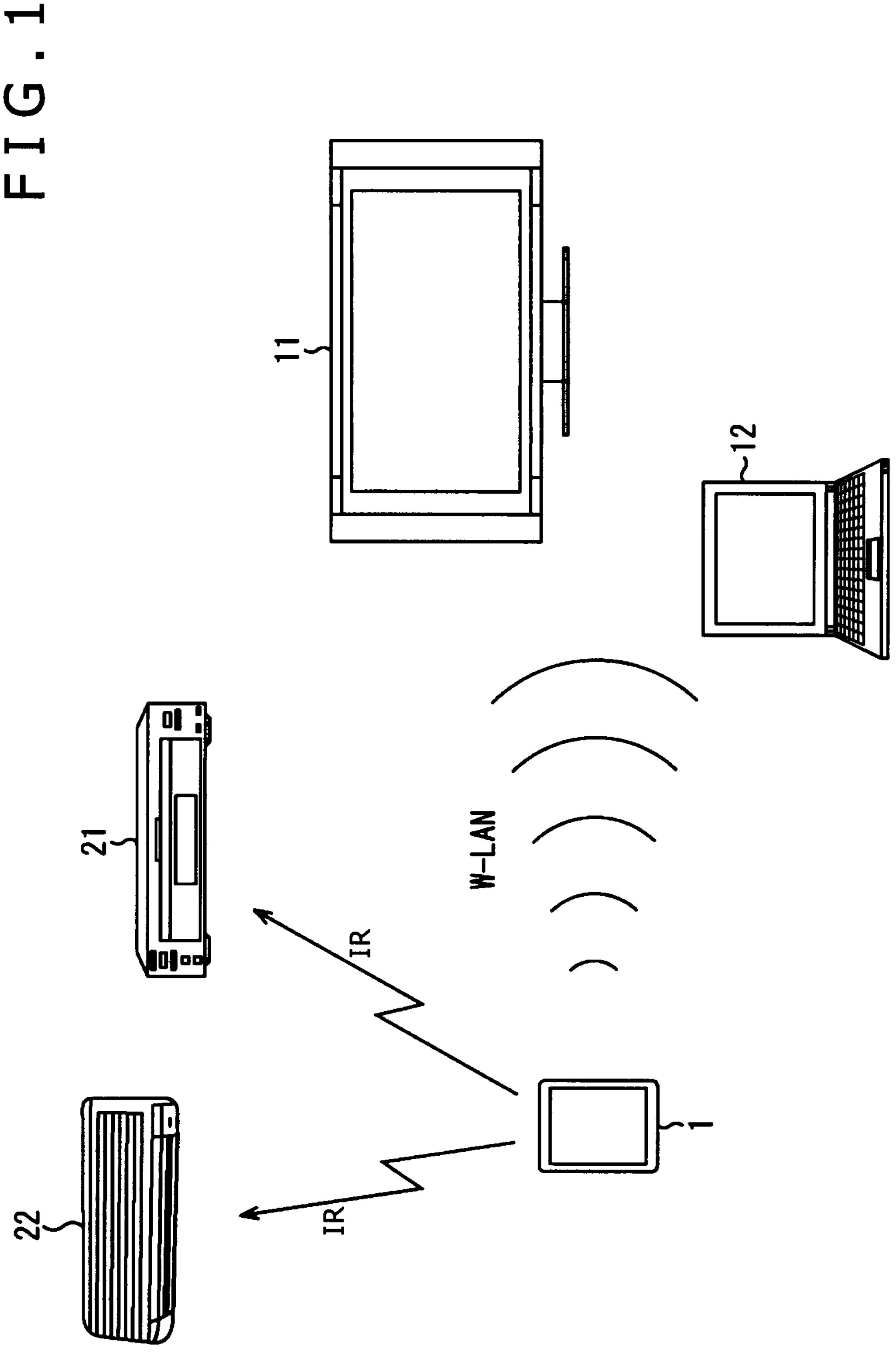
FIG. 1 is a schematic diagram illustrating an exemplary configuration of a communication system that includes an information processing apparatus practiced as one embodiment of the technology.

Referring to FIG. 1, there is shown an exemplary configuration of a communication system that includes an information processing apparatus 1 practiced as one embodiment of the technology.

The information processing apparatus 1 is a terminal of tablet type, which is held by one hand of the user. The user is able to operate this terminal by the other hand, by clicking buttons and the like displayed on the display of this terminal. For this display arranged on one surface of the housing of the information processing apparatus 1, a touch panel is used.

The information processing apparatus 1 is a DLNA device. The information processing apparatus 1 executes wireless communication based on a predetermined standard such as a wireless LAN (Local Area Network) with other DLNA devices including a DLNA device 11 and a DLNA device 12, thereby transmitting content stored in a storage block for example of the information processing apparatus 1 to other DLNA devices to output the content therefrom.

In the example shown in FIG. 1, the DLNA device 11 is a television receiver (TV) and the DLNA device 12 is a note-size PC (Personal Computer). The communication system shown in FIG. 1 includes other DLNA devices, now shown, in addition to the DLNA device 11 and DLNA device 12. In what follows, it is assumed that the DLNA devices other than the information processing apparatus 1 be DLNA devices that function each as a DMR.

Further, the information processing apparatus 1 transmits commands to IR devices including an IR device 21 and IR device 22 by use of IR (Infrared) signals to control these devices. Each IR device has an IR signal receiving block and executes a predetermined operation in accordance with a command transmitted by use of an IR signal.

In the example shown in FIG. 1, the IR device 21 is an AV amplifier and the IR device 22 is an air conditioner. The communication system shown in FIG. 1 also includes IR devices, not shown, other than the IR device 21 and the IR device 22.

To be more specific, the information processing apparatus 1 controls the DLNA devices via a wireless LAN or the like and, at the same time, controls the IR devices by use of IR signals. The information processing apparatus 1 has a DLNA application for functioning as a DLNA device and controlling other DLNA devices and an IR remote controller application for functioning as an IR remote controller and controlling the IR devices.

The information processing apparatus 1 is compatible with a multitask mode, in which the DLNA application and the IR remote controller application can be executed at the same time. In what follows, description will be done on the supposition that, before the selection by the user of a DLNA device subject to control from among the DLNA devices found by the function of the DLNA application, a predetermined IR device have been selected by the user as the IR device to be controlled from among the already registered IR devices. When an IR device subject to control has been selected, a remote control screen showing various buttons is displayed on the display of the information processing apparatus 1. The user can operate the IR device through the remote control screen.

The information processing apparatus 1 having the functions described above searches for DLNA devices by the function of the DLNA application when a DLNA device search operation is specified and displays a DLNA selection screen. In addition, if a predetermined DLNA device has been selected as one to be controlled from the DLNA selection screen, then the information processing apparatus 1 stores, by the function of the IR remote control application, the information indicative of a combination of the IR device being selected and the DLNA device selected to be controlled.

The IR device being selected is the device operated by the user immediately before the selection of the DLNA device. The information processing apparatus 1 stores a log of the combinations of the IR devices and the DLNA devices operated by the user with almost the same timing.

In the information processing apparatus 1, the displaying of the DLNA device selection screen is controlled on the basis of the above-mentioned log of the combinations of IR devices and DLNA devices.

For example, when an instruction of searching for a DLNA device comes again, the information processing apparatus 1 executes a DLNA device search operation by use of the function of the DLNA application in the same manner as described above.

In addition, on the basis of a log of the combinations of IR devices and DLNA devices, the information processing apparatus 1 selects a DLNA device of the same group as that of the IR device being selected by the IR remote control application from among the DLNA devices found the search operation and displays the information about the selected DLNA device onto the selection screen of the DLNA device prior to the information about other DLNA devices found by the search operation. The IR remote control application and the DLNA application cooperate and the information (the setting information indicative of the IR device under selection) managed by the IR remote control application is used for the displaying of the DLNA device selection screen by the DLNA application.

Because an IR signal is directional, the operation of an IR device by use of the function of the IR remote controller denotes that the user is located in a room wherein the IR device being selected as the device subject to control is arranged. In addition, the DLNA device in the same group as that of the IR device being currently selected is the DLNA device operated by the user in the past with almost the same timing of the IR device being selected and is considered to be arranged in the same room as described above.

To be more specific, of the DLNA devices found as a result of a search operation, the DLNA device of the same group as that of the IR device being currently selected by the IR remote control application as the device subject to control is highly possibly the DLNA device arranged in the room where the user is currently located.

As described above, preferentially displaying the information about the DLNA device highly possibly arranged in the room where the user is also located onto the selection screen allows the user to distinctively recognize the DLNA device arranged in the room where the user is located from other DLNA devices arranged in other rooms. In addition, this preferential display allows the user to intuitively select a DLNA device to be operated. It is usual for the user to operate the DLNA device arranged in the room where the user is located.

Depending on DLNA device search operations, a DLNA device arranged in a room other than a room where the user is currently located may be found. If the information about the DLNA device arranged in the room where the user is located is displayed in the same manner the information about a DLNA device arranged in another room, it takes time for the user to search for a DLNA device to be operated, which can be avoided by the above-mentioned preferential display of the information about the DLNA device arranged in the room where the user is located.

A sequence of operations of the information processing apparatus 1 for controlling the displaying of the DLNA device selection screen by linking the IR remote control application and the DLNA application each other as described above will be described later.

Configuration of the Information Processing Apparatus 1

Figure 2:
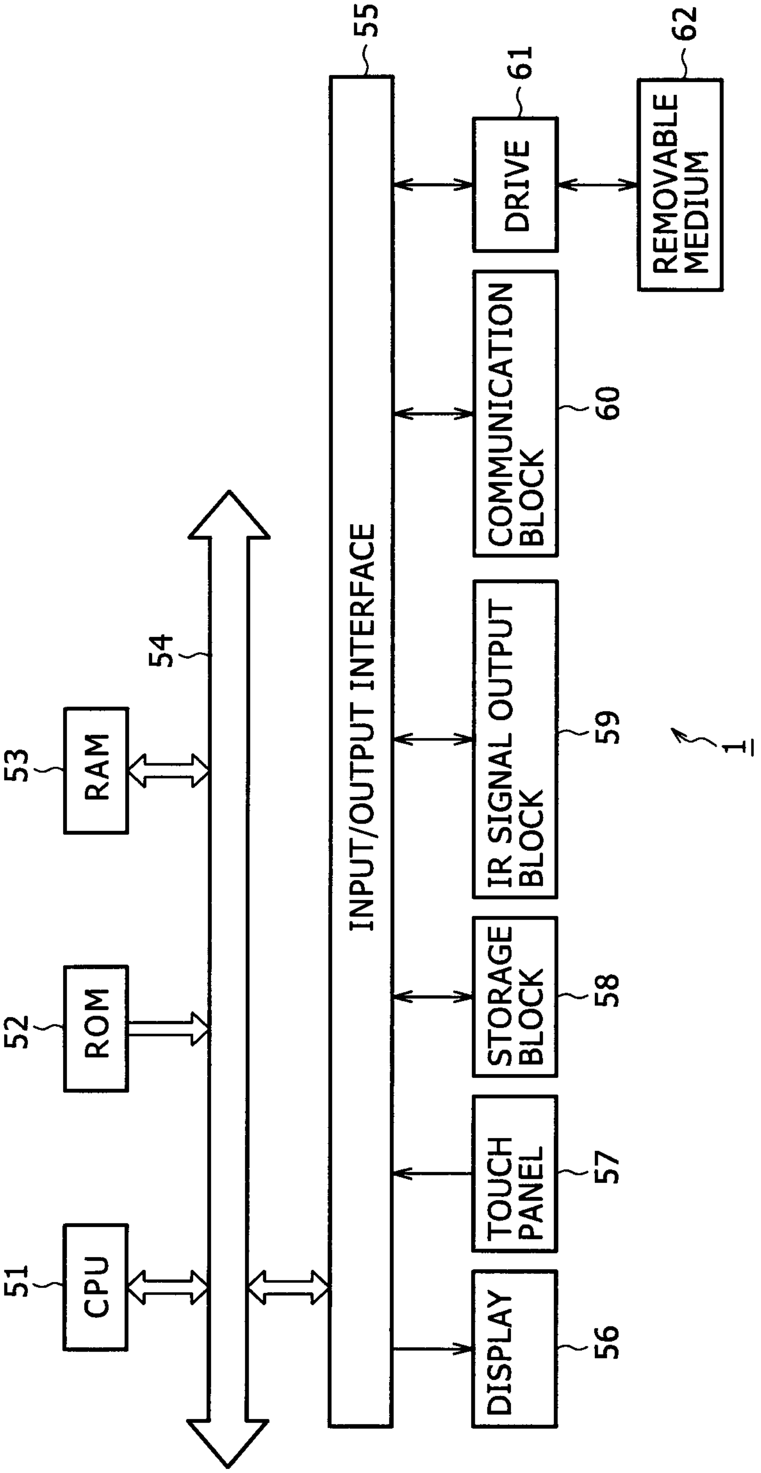
FIG. 2 is a block diagram illustrating an exemplary hardware configuration of the information processing apparatus.

Referring to FIG. 2, there is shown a block diagram illustrating an exemplary hardware configuration of the information processing apparatus 1.

A CPU (Central Processing Unit) 51, a ROM (Read Only Memory) 52, and a RAM (Random Access Memory) 53 are interconnected by a bus 54.

The bus 54 is connected to an input/output interface 55. The input/output interface 55 is connected to a display 56, a touch panel 57, a storage block 58, an IR signal output block 59, a communication block 60, and a drive 61.

The display 56 is based on an LCD (Liquid Crystal Display) or the like to display various screens, such as a remote control screen for IR device operation, an IR device selection screen, and a DLNA device selection screen.

The touch panel 57 is arranged as laid on the display 56 to detect a user operation and output information indicative of a detection result.

The storage block 58, based on a hard disk drive or a flash memory, stores IR remote control preset information and contents such as music, video, and still images (photographs), for example. The IR remote control preset information includes a command set and remote control screen information as related with the model name, manufacturer name, and a serial number, for example, of each IR device.

In addition, the storage block 58 updates a log of combinations of IR devices and DLNA devices every time a DLNA device search operation is executed while an IR device is selected and a predetermined DLNA device is selected to be controlled.

Under the control of the CPU 51, the IR signal output block 59 transmits commands for controlling an IR device by use of an IR signal.

The communication block 60, based on a wireless LAN interface for example, executes communication with DLNA devices.

The drive 61 reads content from a removable medium 62 if the content to be reproduced on a DLNA device is stored in the removable medium 62.

Figure 3:
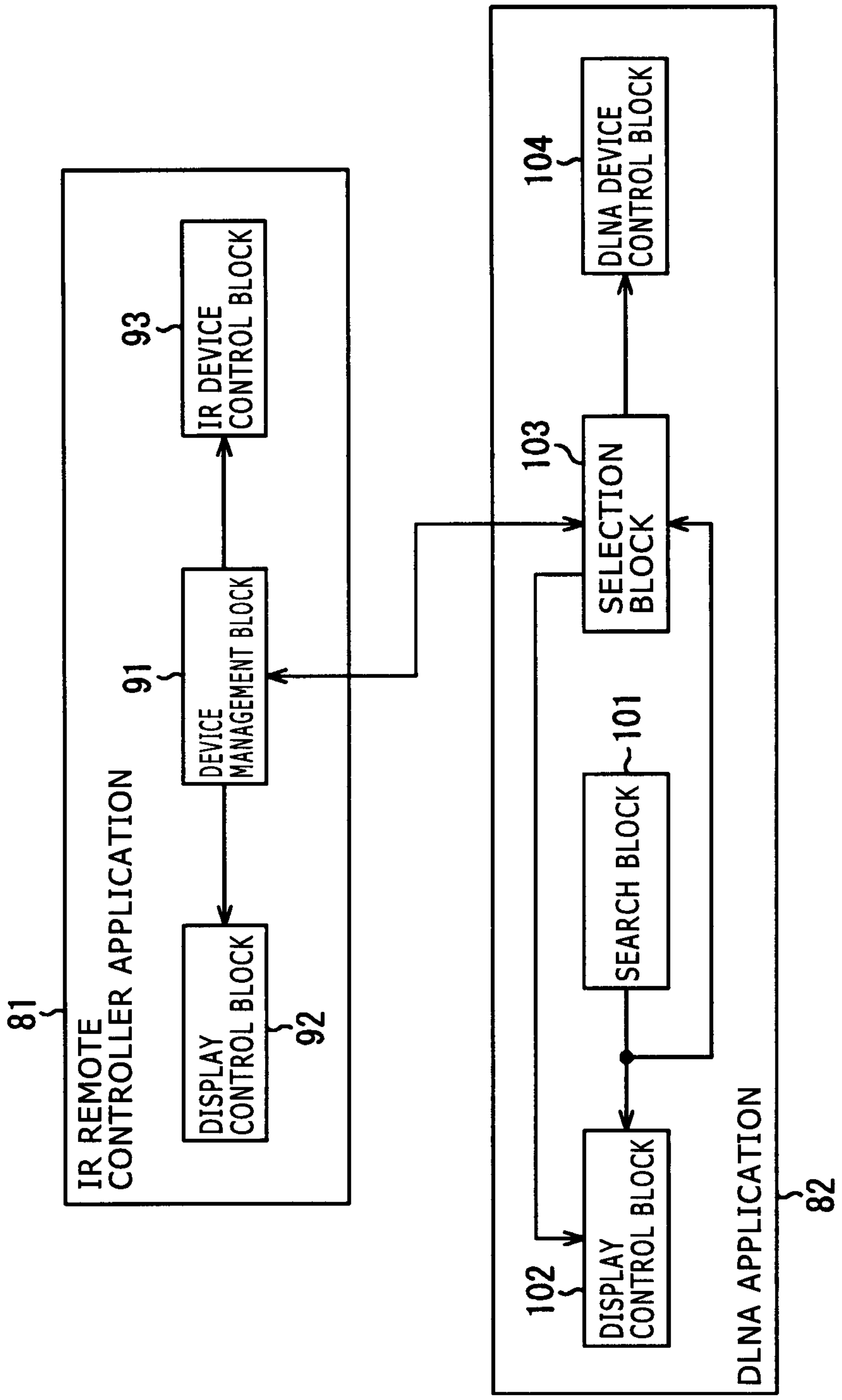
FIG. 3 is a block diagram illustrating an exemplary functional configuration of the information processing apparatus.

Referring to FIG. 3, there is shown a block diagram illustrating an exemplary functional configuration of the information processing apparatus 1. In the information processing apparatus 1, a device management block 91, a display control block 92, an IR device control block 93, a search block 101, a display control block 102, a selection block 103, and a DLNA device control block 104 are realized.

The device management block 91, the display control block 92, and the IR device control block 93 are realized when a remote control application 81 is executed by the CPU 51 shown in FIG. 2.

The device management block 91 manages registered IR devices. The registration of IR devices is executed by the user by selecting a predetermined device from among the IR devices on which information such as command set is preset or by selecting a remote control code.

If an instruction is issued by the user for selecting an IR device to be controlled, the device management block 91 reads the information about registered IR devices from the storage block 58 and outputs this information to the display control block 92. The information outputted to the display control block 92 includes IR device names such as AV amplifier and air conditioner, for example, and icons indicative of IR device external views.

Further, if an IR device to be controlled is selected by the user, the device management block 91 stores the setting information of the selected IR device into the RAM 53 for management. The device management block 91 outputs the setting information to the IR device control block 93 and, at the same time, outputs the information about the remote control screen for the selected IR device to the display control block 92.

If the information about registered IR devices is supplied from the device management block 91, the device management block 91 displays an IR device selection screen to the display 56. As will be described later, the IR device selection screen shows the icons of the IR devices along with the names thereof for example. If an IR device to be controlled is selected, the display control block 92 displays a remote control screen onto the display 56 on the basis of the information supplied from the device management block 91.

If the IR device to be controlled is selected and a predetermined button on the remote control screen is pressed, then the IR device control block 93 controls the IR signal output block 59 to transmit a command assigned to the button operated by the user.

The search block 101, the display control block 102, the selection block 103, and the DLNA device control block 104 are realized by executing a DLNA application 82 by the CPU 51 shown in FIG. 2.

If an instruction of searching DLNA devices is issued by the user, the search block 101 controls the communication block 60 to search for a DLNA device that functions as a DMR. The search block 101 outputs the information about the DLNA device found by the search to the display control block 102 and the selection block 103. The DLNA device information outputted from the search block 101 includes the DLNA device name, manufacturer name and an icon indicative of the external view of this DLNA device for example, obtained from the DLNA device found by the search.

If the information about a DLNA device is supplied from the search block 101, the display control block 102 displays a DLNA device selection screen onto the display 56. As will be described later, The DLNA device selection screen shows the icons of DLNA devices along with DLNA device names for example. The displaying of the DLNA device selection screen is controlled on the basis of a log of the combinations of IR devices and DLNA devices. The display control block 102 also shows a selection screen of content to be reproduced by a DLNA device onto the display 56.

If a predetermined DLNA device is selected from the DLNA device selection screen, the selection block 103 references the setting information managed by the device management block 91 to identify the IR device being selected to be controlled by the IR remote control application 81. The selection block 103 stores the information indicative of a combination of the IR device being selected to be controlled by the IR remote control application 81 and the DLNA device selected to be controlled into the storage block 58.

In addition, when a DLNA device search operation is executed with the log of combinations of IR devices and DLNA devices stored in the storage block 58 and the information about DLNA devices is supplied from the search block 101, then the selection block 103 references the setting information managed by the device management block 91 to identify the IR device being selected.

Of the DLNA devices found by the search operation, the selection block 103 selects the DLNA device of the same group as that of the IR device being selected to be controlled by the IR remote control application 81 on the basis of the log of combinations of IR devices and DLNA devices and outputs the information indicative of the selected DLNA device to the display control block 102. On the basis of the information supplied from the selection block 103 to the display control block 102, the displaying of the DLNA device selection screen is controlled. The selection block 103 outputs the information indicative of the DLNA device selected to be controlled to the DLNA device control block 104.

The DLNA device control block 104 controls the communication block 60 and transmits content along with a command to the DLNA device selected to be controlled. The content to be transmitted to the DLNA device is read from the storage block 58 for example.

Operations of the Information Processing Apparatus 1

The following describes a sequence of operations to be executed by the information processing apparatus 1 that has the configuration described above.

Figure 4:
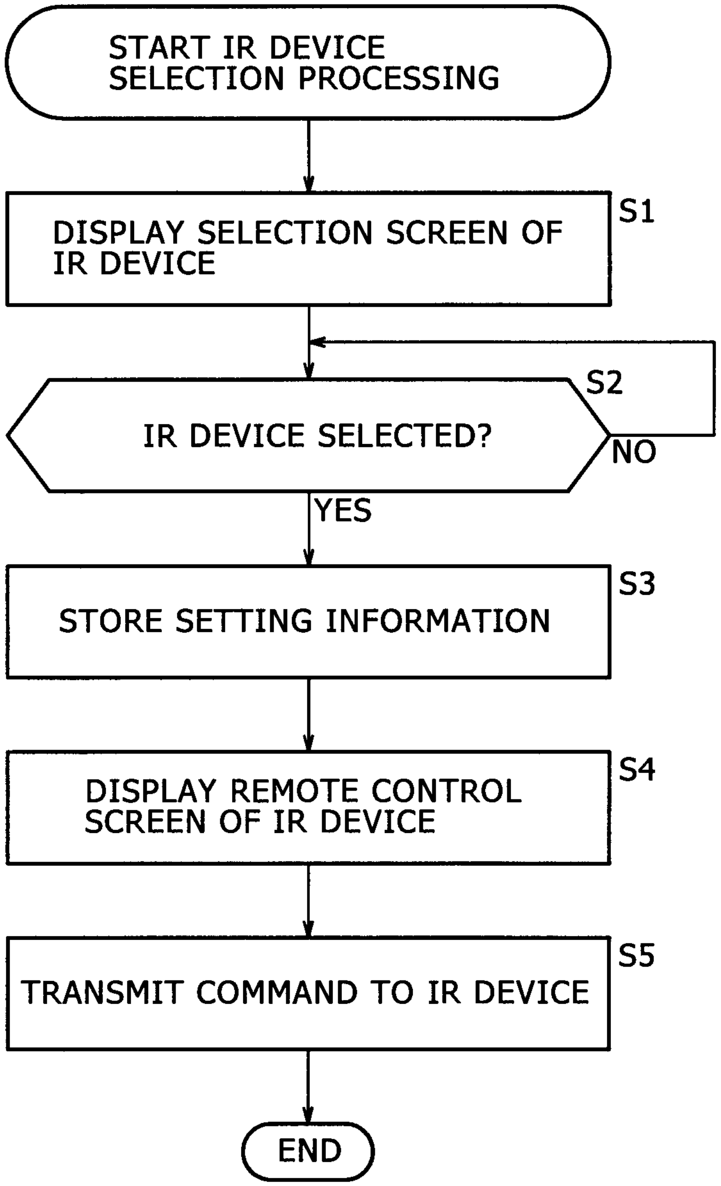
FIG. 4 is a flowchart indicative of selection processing for selecting an IR (infrared) device.

First, the processing to be executed by the information processing apparatus 1 for selecting IR devices to be controlled will be described with reference to the flowchart shown in FIG. 4. The processing shown in FIG. 4 is executed by each part of the IR remote control application 81 when the IR remote control application 81 is launched and the selection of IR devices is specified by the user. From the device management block 91, the information about registered IR devices is supplied to the display control block 92.

In step S1, the display control block 92 displays an IR device selection screen onto the display 56 on the basis of the information supplied from the device management block 91.

Figure 5:
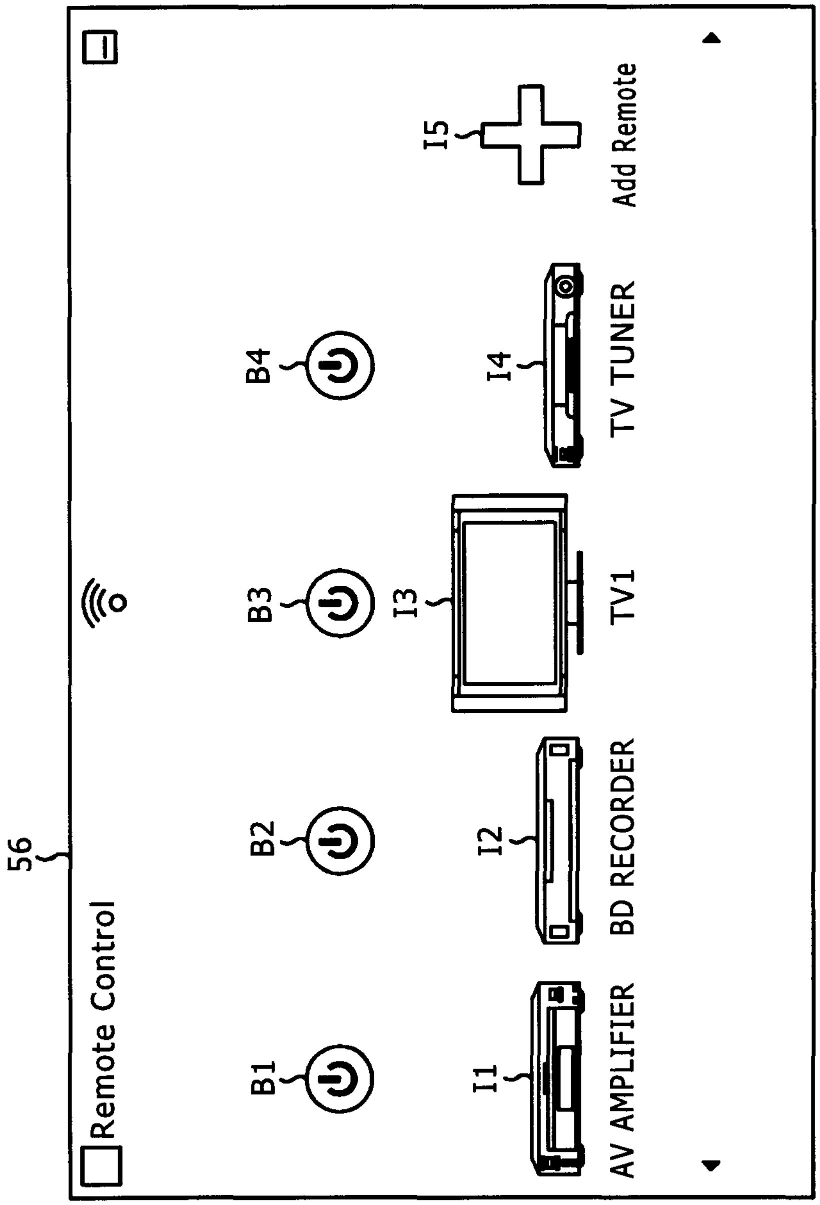
FIG. 5 is a schematic diagram illustrating an example of a selection screen for selecting an IR device.

Referring to FIG. 5, there is shown an exemplary IR device selection screen.

The IR device selection screen shows icons I1 through I4 indicative of the registered IR devices in the horizontal direction. The icon I1 represents an AV amplifier, the icon I2 is representative of BD (Blu-ray (trademark) Disc) recorder, the icon I3 is representative of a TV1, and the icon I4 is representative of a TV tuner. An icon I5 displayed to the right side of the icon I4 is selected when an IR device is additionally registered.

By selecting any one of the icons I1 through I4 or any one of buttons B1 through B4 displayed over the icons I1 through I4, respectively, for example, the user can select an IR device to be controlled.

Referring to FIG. 4 again, the device management block 91 determines in step S2 whether an IR device has been selected from the selection screen and waits until the selection screen is found to have been selected.

If an IR device is found to have been selected in step S2, then the device management block 91 stores the setting information indicative of the IR device being selected into the RAM 53 for management in step S3.

In step S4, the display control block 92 displays a remote control screen for the IR device selected by the user onto the display 56 on the basis of the information supplied from the device management block 91. When the IR device has been selected, remote control screen information is supplied from the device management block 91 to the display control block 92.

In step S5, the IR device control block 93 transmits a command in response to the operation of a predetermined button displayed on the remote control screen to control the IR device. Then, this processing is terminated. This processing is executed before the selection of a DLNA device to be controlled.

Figure 6:
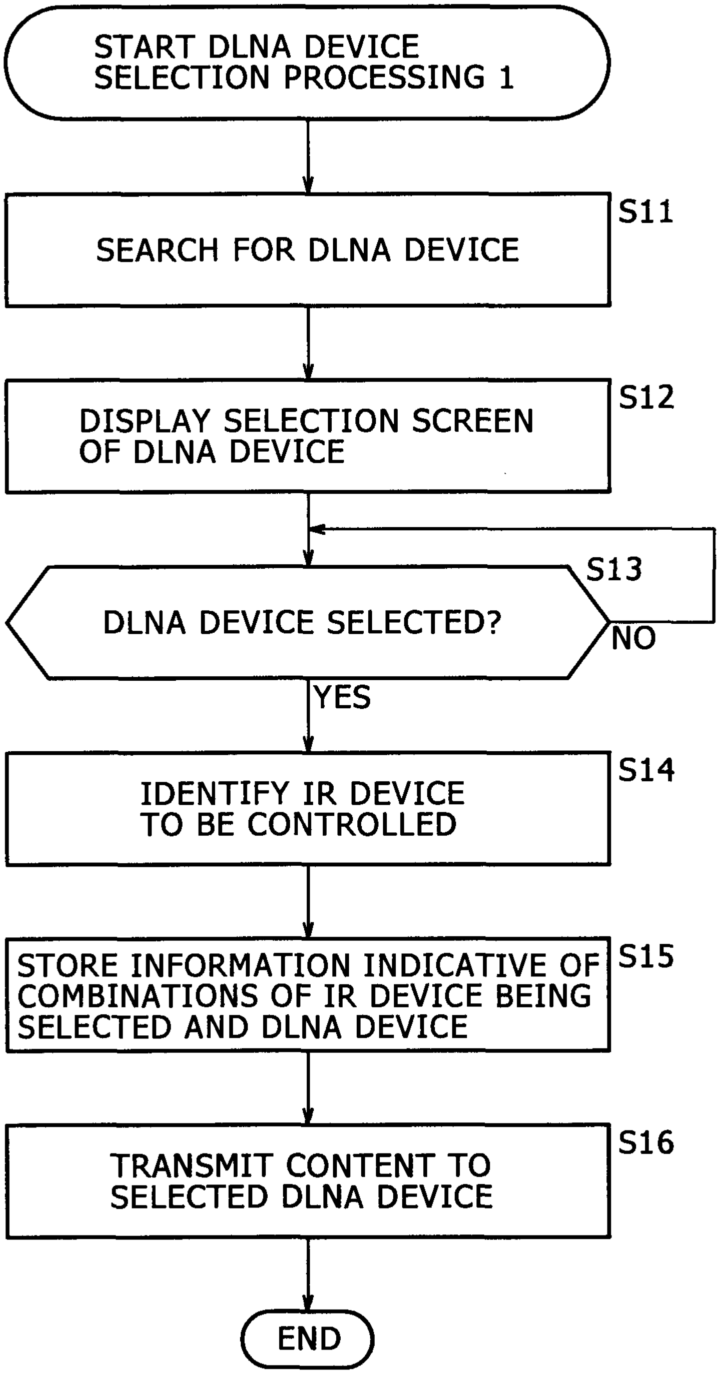
FIG. 6 is a flowchart indicative of selection processing for selecting a DLNA device.

The following describes the processing to be executed by the information processing apparatus 1 for selecting a DLNA device to be controlled with reference to the flowchart shown in FIG. 6. The processing shown in FIG. 6 is executed when a log of combinations of IR devices and DLNA devices is not prepared. This processing is executed by each part of the DLNA application 82 when the DLNA application 82 has been launched and the search for a DLNA device has been specified by the user, for example.

In step S11, the search block 101 searches for a DLNA device.

In step S12, the display control block 102 displays a DLNA device selection screen onto the display 56 on the basis of the information supplied from the search block 101.

Figure 7:
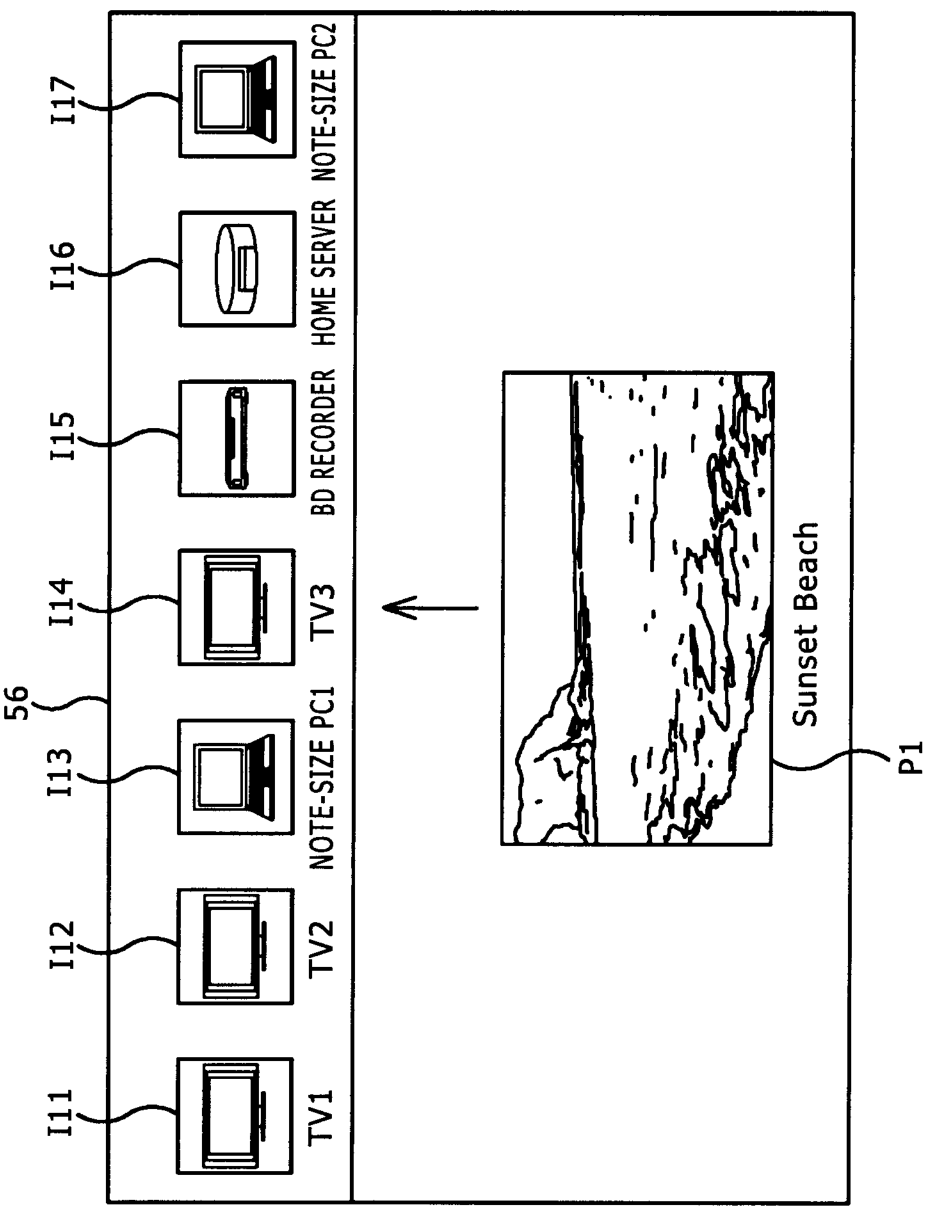
FIG. 7 is a schematic diagram illustrating a first example of a selection screen for selecting a DLNA device.

Referring to FIG. 7, there is shown an exemplary DLNA selection screen.

In the upper part of the DLNA device selection screen, icons I11 through I17 representative of the DLNA devices found by the search operation are arranged in the horizontal direction. The icons I11 through I17 and the names of the DLNA devices displayed below these icons are displayed on the basis of the information obtained from the DLNA device found by the search operation. The icons I11 through I17 are displayed in the order of the DLNA devices found by the search operation, for example.

The icon I11 is representative of TV1 and the icon I12 is representative of TV2. The icon I13 is representative of a note-size PC1 and the icon I14 is representative of TV3. The icon I15 is representative of a BD recorder and the icon I16 is representative of a home server. The icon I117 is representative of a note-size PC2. An image P1 shown under the icons I11 through I17 is representative of a still image selected by the user as the content to be reproduced on a DLNA device.

By selecting any one of the icons I11 through I17, the user can select a DLNA device on which to reproduce the image P1. If a log of combinations of IR devices and DLNA devices is not stored in the storage block 58, then this screen is displayed.

Referring to FIG. 6 again, the selection block 103 determines in step S13 whether a DLNA device has been selected on the selection screen and waits until the selection is found to have been executed.

If a DLNA device is found to have been selected in step S13, then the selection block 103 references the setting information managed by the device management block 91 in step S14 to identify the IR device being selected by the IR remote controller application 81 to be controlled. As described above with reference to the flowchart shown in FIG. 4, if an IR device to be controlled has been selected, the setting information indicative of the selected IR device is managed by the device management block 91.

In step S15, the selection block 103 stores the information about the combinations of IR devices being selected to be controlled and DLNA devices selected to be controlled into the storage block 58.

Referring to FIG. 8, there is shown an exemplary log of combinations of IR devices and DLNA devices.

The log shown in FIG. 8 contains the combinations of TV1 that is an IR device and the note-size PC1 that is a DLNA device and the combinations of an air conditioner that is an IR device and the TV2 and a BD recorder that are DLNA devices. The log stored in the storage block 58 may also contain one IR device and two or more DLNA devices in a related manner.

In step S16, the DLNA device control block 104 transmits the content to the DLNA device selected to be controlled and terminates the processing. The DLNA device that has received the content transmitted from the information processing apparatus 1 reproduces the received content.

Figure 9:
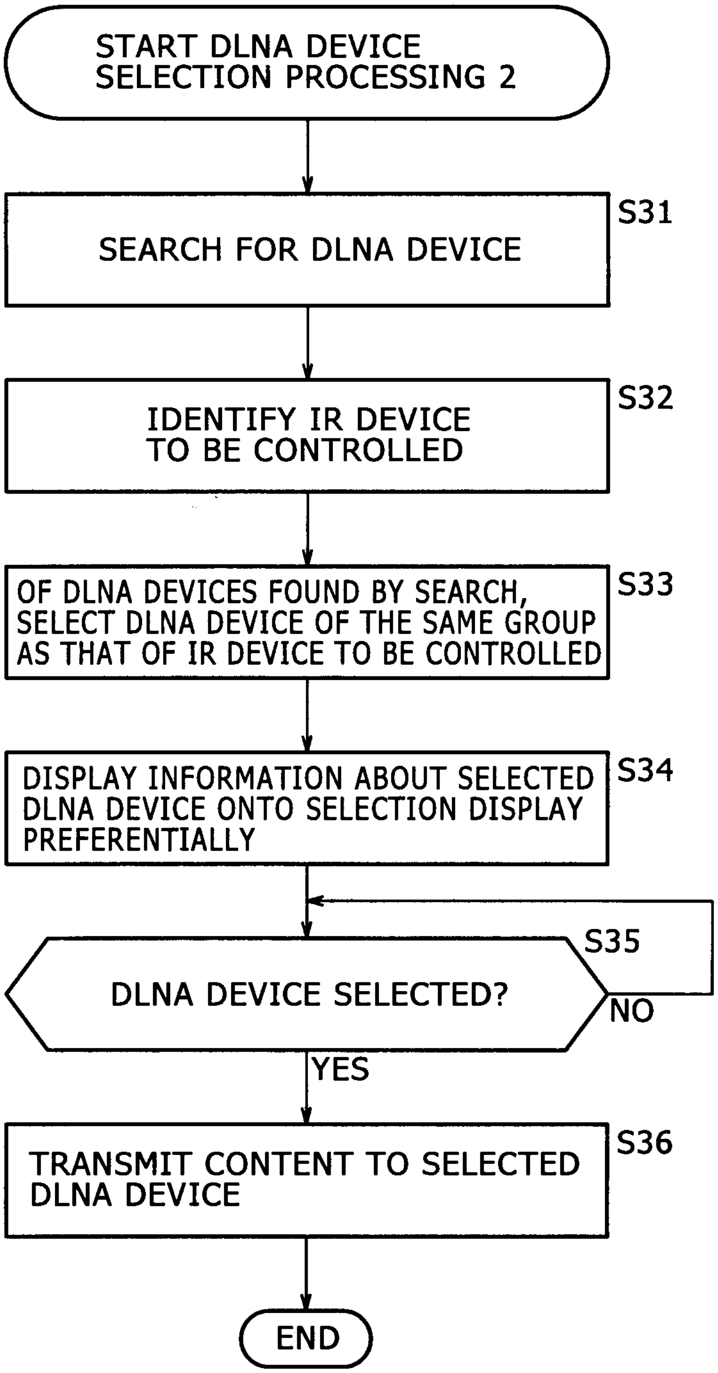
FIG. 9 is a flowchart indicative of another selection processing for selecting a DLNA device.

The following describes another processing operation to be executed by the information processing apparatus 1 to select a DLNA device to be controlled with reference to the flowchart shown in FIG. 9. The processing shown in FIG. 9 is executed when a log of combinations of IR devices and DLNA devices is stored in the storage block 58. Like the processing shown in FIG. 6, the processing shown in FIG. 9 is executed by each part of the DLNA application 82 when the DLNA application 82 has been launched and a DLNA device search operation is specified by the user, for example.

In step S31, the search block 101 searches for a DLNA device.

In step S32, the selection block 103 references the setting information managed by the device management block 91 to identify the IR device being selected to be controlled by the IR remote control application 81.

In step S33, of the DLNA devices found by the search operation, the selection block 103 selects the DLNA device of the same group as that of the IR device being selected to be controlled by the IR remote control application 81 on the basis of the log of combinations of IR devices and DLNA devices.

In step S34, the display control block 102 displays, on the display 56, a DLNA device selection screen on which the information about the DLNA device of the same group as that of the IR device being selected is preferentially displayed.

Figure 10:
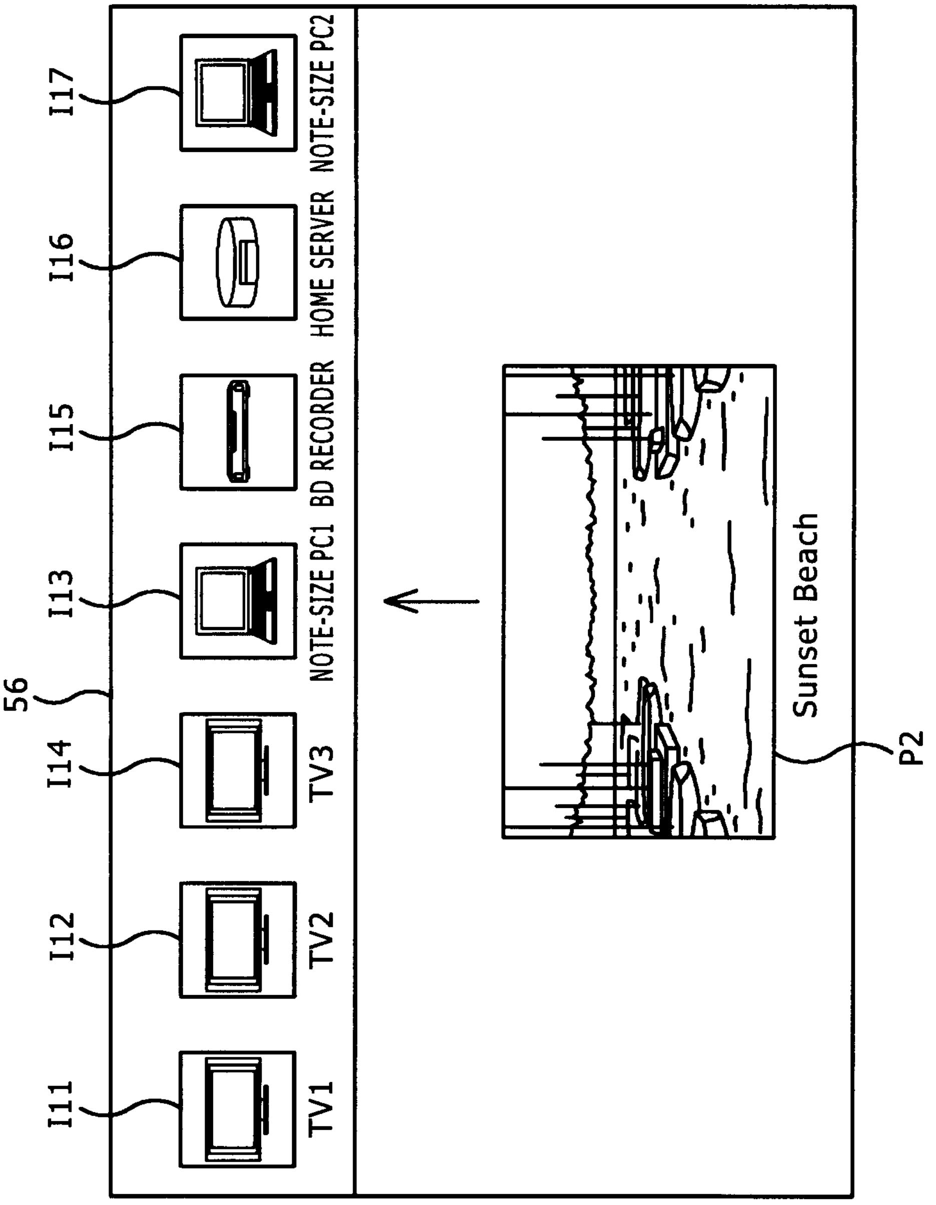
FIG. 10 is a diagram illustrating a second example of a selection screen for selecting a DLNA device.

Referring to FIG. 10, there is shown an exemplary DLNA selection screen.

If the log shown in FIG. 8 is stored in the storage block 58 and the IR device being selected is the TV1, then the DLNA device selection screen shows the icon I13 representative of the note-size PC1 registered in the log as related with the TV1 at the center of the line of the icons I11 through I17. The other icons are sorted in a predetermined order relative to the location of the icon I13.

As described above, preferentially displaying the icon I13 representative of the note-size PC1 at the center allows the user to intuitively select the note-size PC1 that is a DLNA device arranged in the room where the user is located as the DLNA device on which the image P2 is reproduced.

Figure 11:
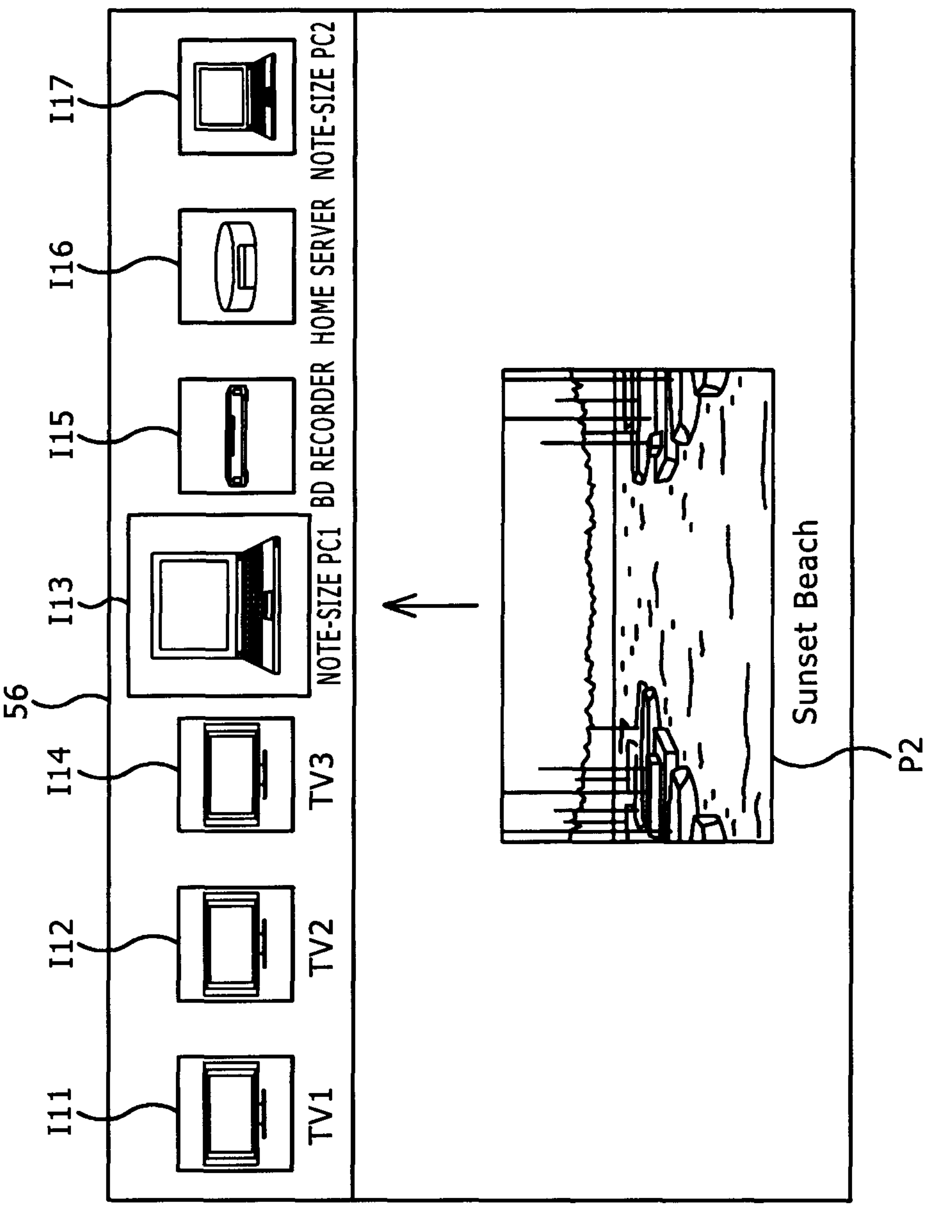
FIG. 11 is a schematic diagram illustrating a third example of a selection screen for selecting a DLNA device.

As a method of preferentially displaying the information about a DLNA device, the icon I13 may be displayed larger than other icons as shown in FIG. 11. In addition, the icon I13 may be displayed in a color other than that of other icons.

Further, if the pieces of the information about the DLNA devices found by the search operation are sequentially displayed one by one, the information about the DLNA device identified as arranged in the room in which the user is located may be displayed first, followed by the information about other DLNA devices.

Referring to FIG. 9 again, the selection block 103 determines in step S35 whether a DLNA device has been selected on the selection screen and waits until the selection is determined.

If a DLNA device is found to have been selected in step S35, then the DLNA device control block 104 transmits the content to the DLNA device selected to be controlled in step S36, thereby terminating the processing.

As described above, controlling the displaying of the DLNA device selection screen by linking the IR remote control application 81 and the DLNA application 82 each other enhances the ease of use of the user.

Variations

Variation 1

In the above-mentioned configuration, the information managed by the IR remote control application 81 is referenced from the DLNA application 82. By contrast, in the selection of an IR device to be controlled, the information managed by the DLNA application 82 may be referenced from the IR remote control application 81.

For example, when the selection of an IR device to be controlled is specified by the user, the information processing apparatus 1 identifies the DLNA device being selected to be controlled by the DLNA application 82 on the basis of the setting information managed by the DLNA application 82. At the same time, of the registered IR devices, the information processing apparatus 1 selects the IR device of the same group as that of the DLNA device being selected to be controlled by the DLNA application 82 and displays the information about the selected IR device onto the IR device display screen prior to the information about the other IR devices already registered. This configuration allows the user to easily select IR devices to be controlled.

Variation 2

In the above-mentioned configuration, the selection of a DLNA device of the same group as that of an IR device being selected is executed in order to control the displaying of a DLNA device selection screen. It is also practicable to execute the selection in order to select a DLNA device to which content is transmitted.

In this case, the selection of DLNA devices by the user is omitted and the content selected by the user is directly transmitted to the DLNA device of the same group as that of the IR device being selected. Thus, the results of the selection of the DLNA device of the same group as that of the IR device being selected are available for various kinds of processing.

Variation 3

In the above-mentioned configuration, the DLNA device of the same group as that of the IR device currently being selected is selected. However, the IR device that provides the standard of DLNA device selection is not limited to the IR device currently being selected.

For example, it is also practicable to select a DLNA device of the same group as that of an IR device selected between a time retrospective by a predetermined period to the current time relative to the current time, such as an IR device selected last but not currently being selected, thereby controlling the displaying of a selection screen. This setup also allows the user to select a DLNA device highly possibly arranged in a room where the user is located from among the DLNA devices found by a search operation.

Variation 4

In the above-mentioned configuration, a DLNA device to be searched for is a DLNA device that functions as a DMR. It is also practicable to apply the above-mentioned technologies to the search for DLNA devices of other device classes, such as DLNA devices functioning as DMS.

Variation 5

The above-mentioned technologies are also applicable to the selection of a device that is a mate of wireless communication, such as wireless LAN or Bluetooth (trademark), rather than the selection of DLNA devices on which content is reproduced.

For example, if there are two or more wireless communication devices around the information processing apparatus 1 and these devices are found by the search based on Bluetooth communication, it is practicable to select, as a communication mate, a device of the same group as that of an IR device currently being selected and execute Bluetooth communication with the selected device. Consequently, the user is able to execute wireless communication with the device arranged in the room where the user is located.

Variation 6

It is also practicable to display the information of all DLNA devices by arranging the information by the DLNA devices of the same group, namely, the DLNA devices that are highly possibly arranged in the same room, on the basis of a log of combinations of IR devices and DLNA devices.

Figure 12:
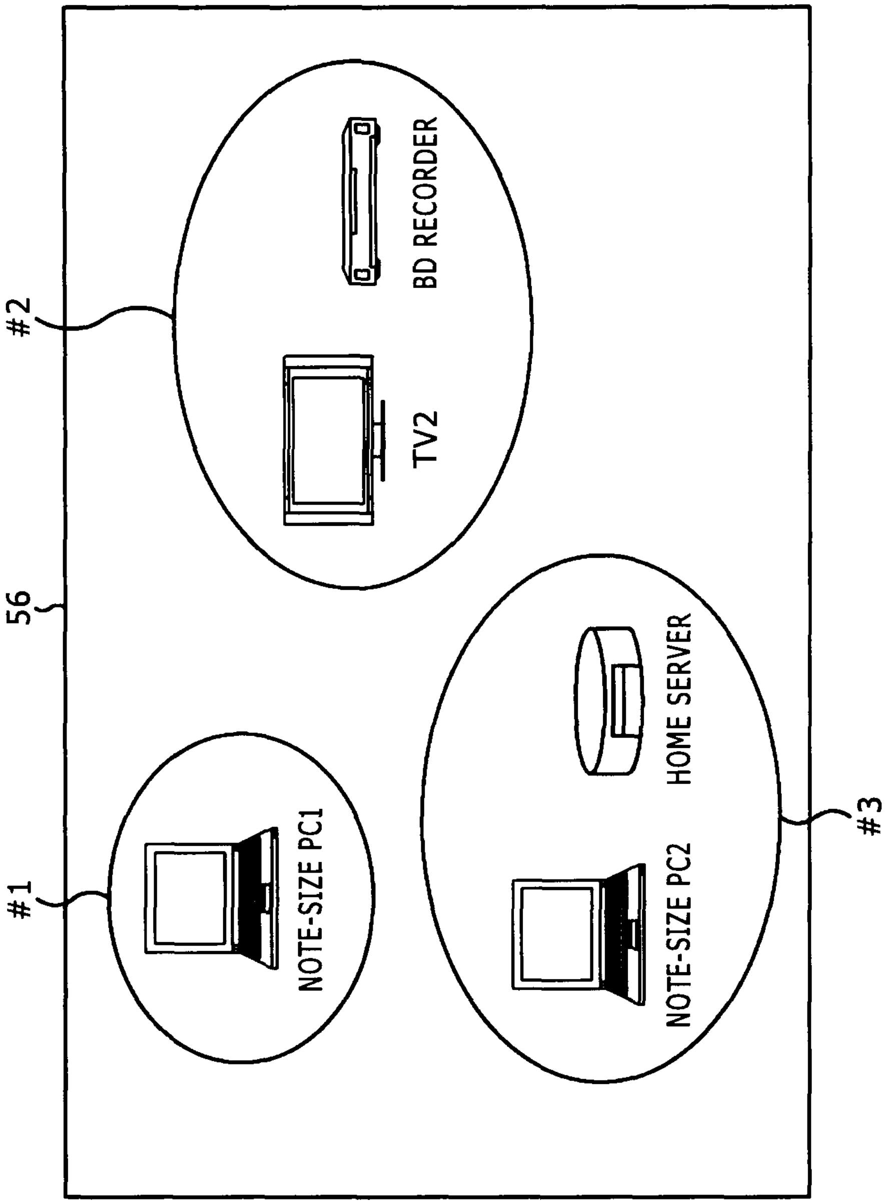
FIG. 12 is a schematic diagram illustrating a fourth example of a selection screen for selecting a DLNA device.

Referring to FIG. 12, there is shown another example of a DLNA device selection screen.

Here, it is assumed that the log shown in FIG. 8 be stored in the storage block 58. In this case, the information processing apparatus 1 determines that there is the note-size PC1 that is a DLNA device in the room where the TV1 that is an IR device is arranged and determines that there is the TV2 and the BD recorder that are DLNA devices in the room where the air conditioner that is an IR device is arranged.

As shown in FIG. 12, the information processing apparatus 1 displays the information about the note-size PC1 that is a DLNA device arranged in a room at a location enclosed by circle #1 and information about the TV2 and the BD recorder that are DLNA devices arranged in another room at locations enclosed by circle #2 collectively. In the example shown in FIG. 12, it is determined that the note-size PC2 and the home server that are DLNA devices are arranged in a same room at locations enclosed by circle #3 collectively.

Consequently, the user is able to check the DLNA devices arranged in these rooms to select a desired DLNA device.

Variation 7

In the above-mentioned configuration, the remote control function is realized by use of IR signals. It is also practicable to use other signals if these signals are directional like the IR signal.

(2) Second Embodiment

The following describes a case in which the registration of an IR device is executed by use of the information obtained from a DLNA device found by a search operation. As described above, from a DLNA device found by a search operation, the information such as the name of the DLNA device, the manufacturer name of the DLNA device, and an icon representative of the external view of the DLNA device, for example, are obtained.

Configuration of the Information Processing Apparatus 1

Figure 13:
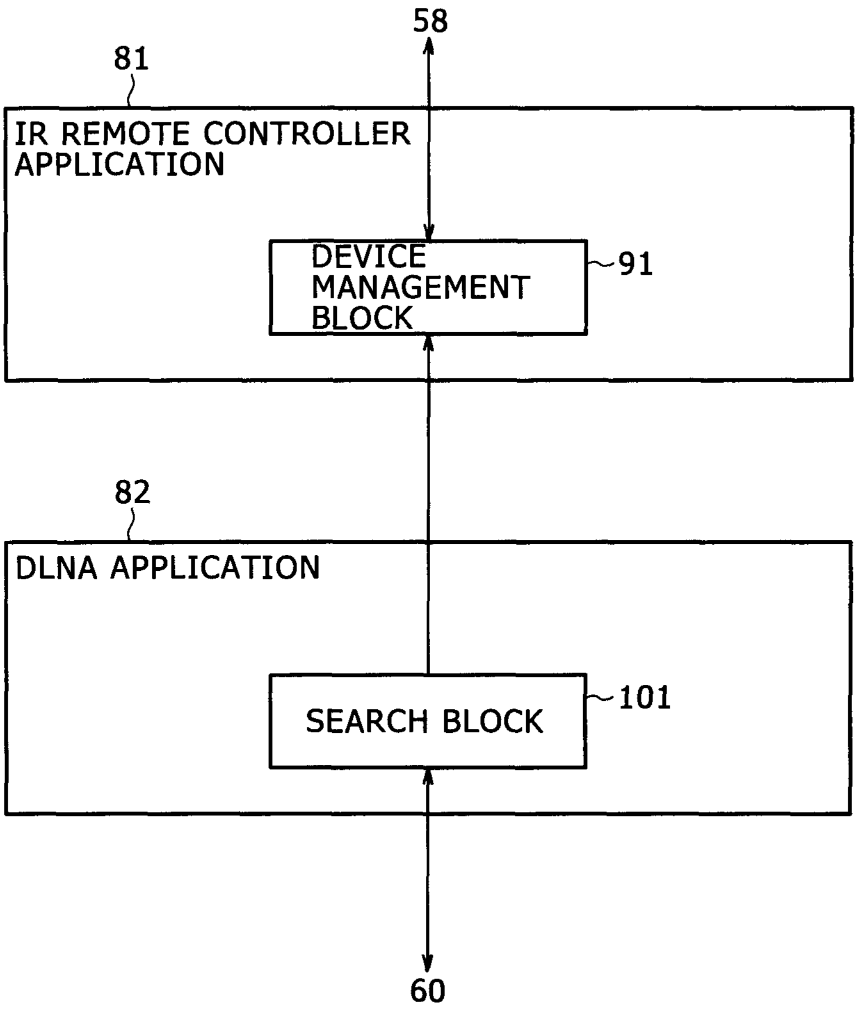
FIG. 13 is a block diagram illustrating an example functional configuration of the information processing apparatus.

Referring to FIG. 13, there is shown a block diagram illustrating an exemplary functional configuration of the information processing apparatus 1.

FIG. 13 shows only a configuration of the processing related with the registration of IR devices among the configurations shown in FIG. 3. With reference to FIG. 13, components similar to those previously described with reference to FIG. 3 are denoted by the same reference numerals. The duplicate parts of description will be skipped appropriately.

If a DLNA device search operation is specified by the user, the search block 101 controls the communication block 60 to execute the specified DLNA device search operation. The search block 101 outputs such information obtained from the DLNA device found by the search operation as the name and manufacturer name of the DLNA device and an icon representative of the outline thereof to the device management block 91.

From among the DLNA devices on which the information such as a command set is preset, the device management block 91 searches for the same device as the DLNA device searched for by the search block 101. For example, the device management block 91 searches for an IR device having the same name and manufacturer name included in the information about the DLNA device supplied from the search block 101. Some of the DLNA devices may be operated by the function of the IR remote controller of the information processing apparatus 1. Of the DLNA devices searched for by the search block 101, the devices that may be operated from the information processing apparatus 1 through the function of the IR remote controller are searched for.

The device management block 91 registers a device found among the IR devices on which the information such as a command set is preset as an IR device that may be operated by the function of the IR remote controller of the information processing apparatus 1. For example, the device management block 91 executes IR device registration by storing the name, manufacturer name, and icon of the IR device into the storage block 58 as related with the information of command set and remote control screen. For the icon representative of the outline of the IR device, an icon obtained by the search block 101 is used.

Operation of the Information Processing Apparatus 1

The following describes a sequence of operations to be executed by the information processing apparatus 1 that registers IR devices as described above.

Figure 14:
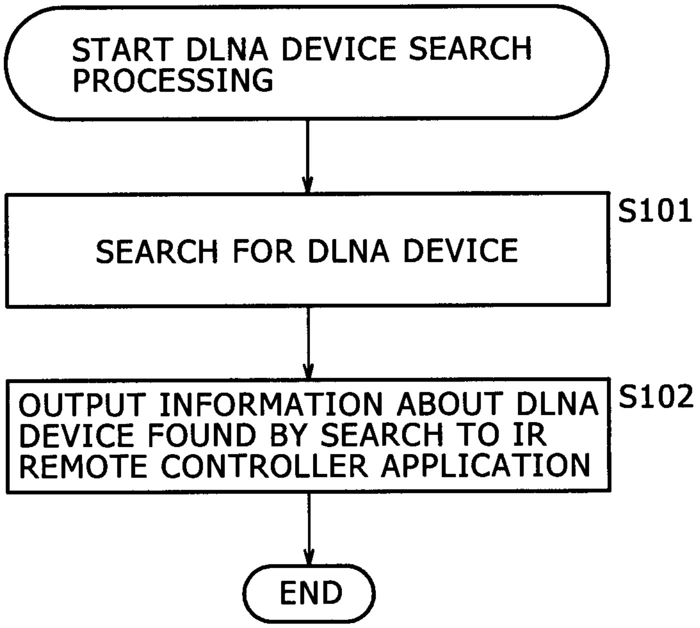
FIG. 14 is a flowchart indicative of search processing for searching for a DLNA device.

First, the processing to be executed by the information processing apparatus 1 in searching for DLNA devices will be described with reference to the flowchart shown in FIG. 14.

In step S101, the search block 101 searches for DLNA devices.

In step S102, the search block 101 outputs the information about DLNA devices found as a result of the search operation to the device management block 91, thereby terminating this processing.

Figure 15:
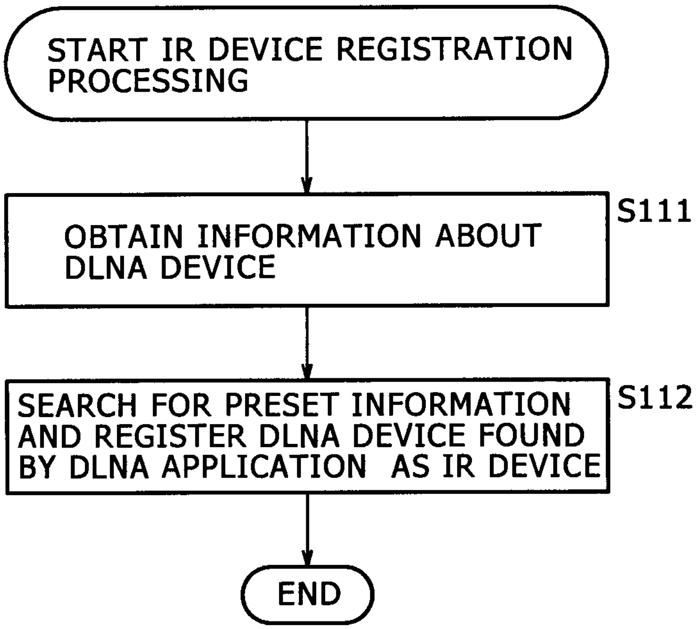
FIG. 15 is a flowchart indicative of registration processing for registering an IR device.

The following describes the processing by the information processing apparatus 1 for registering IR devices with reference to the flowchart shown in FIG. 15. This processing starts upon supplying of the information about DLNA devices found as a result of the search operation from the search block 101.

In step S111, the device management block 91 obtains the information about DLNA devices supplied from the search block 101.

In step S112, on the basis of the information about the obtained DLNA device, the device management block 91 searches for a preset IR device and registers the same device as the DLNA device found by the search block 101 as an IR device that can be operated from the information processing apparatus 1.

Consequently, the user is able to easily register an IR device into the information processing apparatus 1 without manually selecting the IR device from among the preset IR devices.

About Programs

The above-mentioned sequence of processing operations may be executed by software as well as hardware. When the above-mentioned sequence of processing operations is executed by software, the programs constituting the software are installed in a computer which is built in dedicated hardware equipment or installed into a general-purpose personal computer.

Programs to be installed are provided as recorded to the removable media 62 shown in FIG. 2 based on an optical disc (CD-ROM (Compact Disc-Read Only Memory), a DVD (Digital Versatile Disc) or the like), or a semiconductor memory, for example. It is also practicable to provide these programs via wired or wireless transmission media such as a local area network, the Internet, or digital broadcasting, for example. These programs may also be stored in the ROM 52 or the storage block 58 in advance.

It should be noted that the programs to be executed by the computer may be executed in a time-dependent manner in the sequences described herein or in parallel or on an on-demand basis.

While preferred embodiments of the present technology have been described using specific terms, such description is for illustrative purpose only, and it is to be understood that changes and variations may be made without departing from the spirit or scope of the following claims.

Exemplary Combinations of Configurations

Embodiments of the present technology can take the following configurations.

(1) An information processing apparatus including:

a storage block configured to store information about a combination of devices being selected to be controlled by a function of a first application and devices being selected to be controlled by a function of a second application; and a selection block configured to select, among the devices controllable by the function of the above-mentioned second application, a device in the same combination being selected to be controlled by the function of the above-mentioned first application on the basis of the above-mentioned information stored in the above-mentioned storage block.

(2) The information processing apparatus according to (1) above, if information of a device controllable by the function of the above-mentioned second application is displayed, further including:

a display control block configured to display information about a device selected by the above-mentioned selection block prior to information about other devices.

(3) The information processing apparatus according to (2) above, wherein the above-mentioned display control block displays the information about the device selected by the above-mentioned selection block at a center of information about a device controllable by the function of above-mentioned second application.

(4) The information processing apparatus according to (2) or (3) above, wherein the above-mentioned display control block displays the information about the device selected by above-mentioned selection block larger than the information about other devices.

(5) The information processing apparatus according to any one of (2) through (4) above, wherein the above-mentioned display control block displays the information about the device selected by above-mentioned selection block in a color different from that of the information about other devices.

(6) The information processing apparatus according to (2) above, further including:

a control block configured to control a predetermined device selected from among devices controllable by the function of the above-mentioned second application.

(7) The information processing apparatus according to any one of (1) through (3) above, wherein above-mentioned first application is an application having a function of transmitting a signal by use of infrared radiation to control a device to be controlled and the above-mentioned second application is an application having a function of transmitting a signal by use of electromagnetic waves to control a device to be controlled.

(8) The information processing apparatus according to (7) above, wherein the above-mentioned second application is an application for controlling a device compliant with a DLNA standard.

(9) The information processing apparatus according to any one of (1) through (7), wherein, if a first device is selected to be controlled by the function of the above-mentioned first application and when a second device is selected to be controlled by the function of the above-mentioned second application, above-mentioned storage block stores information indicative of a combination of the above-mentioned first device and above-mentioned second device.

(10) The information processing apparatus according to (9), wherein the above-mentioned storage block updates the information about the combination of the above-mentioned first device and the above-mentioned second device every time the above-mentioned second device is selected to be controlled.

(11) The information processing apparatus according to (9) or (10), wherein the above-mentioned storage block stores information indicative of a combination of a singularity of the above-mentioned first device and a plurality of the above-mentioned second devices.

(12) An information processing method including:

storing information about a combination of devices being selected to be controlled by a function of a first application and devices being selected to be controlled by a function of a second application; and selecting, among the devices controllable by the function of the above-mentioned second application, a device in the same combination being selected to be controlled by the function of the above-mentioned first application on the basis of the above-mentioned stored information.

(13) A program for making a computer execute processing including:

storing information about a combination of devices being selected to be controlled by a function of a first application and devices being selected to be controlled by a function of a second application; and selecting, among the devices controllable by the function of the above-mentioned second application, a device in the same combination being selected to be controlled by the function of the above-mentioned first application on the basis of the above-mentioned stored information.

The present application contains subject matter related to that disclosed in Japanese Priority Patent Application JP 2011-113842 filed in the Japan Patent Office on May 20, 2011, the entire content of which is hereby incorporated by reference.

What is claimed is:

1. An information processing apparatus comprising:

a storage block configured to store information about a combination of first devices being selected to be controlled by a function of a first application and second devices being selected to be controlled by a function of a second application, wherein said first application is an application having a function of transmitting a signal by use of infrared radiation and said second application is an application for controlling a device compliant with a DLNA standard, DLNA standing for Digital Living Network Alliance; and a selection block configured to select, among a plurality of second devices controllable by the function of said second application, a respective second device in the same combination as a respective first device being selected to be controlled by the function of said first application on the basis of the above-mentioned information stored in said storage block, wherein the information about the combination of the first devices and the second devices comprises a log of devices selected in a predetermined temporal relation to one another between the first devices and the second devices, wherein said storage block is further configured to update the information comprising the log of the devices selected in the predetermined temporal relation to one another every time respective devices from among the first devices and the second devices are selected to be controlled within a predetermined amount of time as one another, and wherein the storage block and the selection block are each implemented via at least one processor.

2. The information processing apparatus according to claim 1, if information of the plurality of second devices controllable by the function of said second application is displayed, the apparatus further comprising:

a display control block configured to display information about the respective second device selected by said selection block prior to information about other devices of the plurality of second devices controllable by the function of said second application, wherein the display control block is implemented via at least one processor.

3. The information processing apparatus according to claim 2, wherein said display control block is further configured to display the information about the respective second device selected by said selection block at a center of information about the plurality of second devices controllable by the function of said second application.

4. The information processing apparatus according to claim 2, wherein said display control block is further configured to display the information about the respective second device selected by said selection block larger than the information about the other devices of the plurality of second devices controllable by the function of said second application.

5. The information processing apparatus according to claim 2, wherein said display control block is further configured to display the information about the respective second device selected by said selection block in a display color different from a display color of the information about the other devices of the plurality of second devices controllable by the function of said second application.

6. The information processing apparatus according to claim 2, further comprising:

a control block configured to control a second device selected from among the displayed plurality of second devices controllable by the function of said second application, wherein the control block is implemented via at least one processor.

7. The information processing apparatus according to claim 1, wherein said storage block is further configured to store information indicative of a combination of a single first device being selected to be controlled by the function of the first application and a plurality of the second devices being selected to be controlled by the function of the second application with the predetermined temporal relation between the single first device and the plurality of second devices.

8. The information processing apparatus according to claim 2, wherein the display control block is further configured to display the information about the other devices of the plurality of second devices controllable by the function of said second application based on a predetermined spatial relation between the respective second device selected by the selection block and the other devices of the plurality of second devices controllable by the function of said second application.

9. An information processing method, implemented via at least one processor, the method comprising:

storing information about a combination of first devices being selected to be controlled by a function of a first application and second devices being selected to be controlled by a function of a second application, wherein said first application is an application having a function of transmitting a signal by use of infrared radiation and said second application is an application for controlling a device compliant with a DLNA standard, DLNA standing for Digital Living Network Alliance; and selecting, among a plurality of second devices controllable by the function of said second application, a respective second device in the same combination as a respective first device being selected to be controlled by the function of said first application on the basis of the above-mentioned stored information, wherein the information about the combination of the first devices and the second devices comprises a log of devices selected in a predetermined temporal relation to one another between the first devices and the second devices, and wherein storing the information about the combination of first devices and second devices further comprises updating the information comprising the log of the devices selected in the predetermined temporal relation to one another every time respective devices from among the first devices and the second devices are selected to be controlled within a predetermined amount of time as one another.

10. A non-transitory computer-readable medium having embodied thereon a program, which when executed by a computer, causes the computer to perform a method, the method comprising:

storing information about a combination of first devices being selected to be controlled by a function of a first application and second devices being selected to be controlled by a function of a second application, wherein said first application is an application having a function of transmitting a signal by use of infrared radiation and said second application is an application for controlling a device compliant with a DLNA standard, DLNA standing for Digital Living Network Alliance; and selecting, among a plurality of second devices controllable by the function of said second application, a respective second device in the same combination as a respective first device being selected to be controlled by the function of said first application on the basis of the above-mentioned stored information, wherein the information about the combination of the first devices and the second devices comprises a log of devices selected in a predetermined temporal relation to one another between the first devices and the second devices, and wherein storing the information about the combination of first devices and second devices further comprises updating the information comprising the log of the devices selected in the predetermined temporal relation to one another every time respective devices from among the first devices and the second devices are selected to be controlled within a predetermined amount of time as one another.

* * * * *